US007856351B2

(12) United States Patent
Yaman et al.

(10) Patent No.: US 7,856,351 B2
(45) Date of Patent: Dec. 21, 2010

(54) INTEGRATED SPEECH RECOGNITION AND SEMANTIC CLASSIFICATION

(75) Inventors: Sibel Yaman, Atlanta, GA (US); Li Deng, Sammamish, WA (US); Dong Yu, Kirkland, WA (US); Ye-Yi Wang, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/655,703

(22) Filed: Jan. 19, 2007

(65) Prior Publication Data

US 2008/0177547 A1 Jul. 24, 2008

(51) Int. Cl.
*G06F 17/27* (2006.01)

(52) U.S. Cl. .................. 704/9; 704/257; 704/256.2; 704/4; 704/251; 704/260

(58) Field of Classification Search .................. 704/9, 704/257, 260, 255, 256, 4, 2, 232, 251, 258, 704/240, 231
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 5,805,832 A | * | 9/1998 | Brown et al. | 711/1 |
| 5,828,999 A | * | 10/1998 | Bellegarda et al. | 704/240 |
| 5,991,710 A | * | 11/1999 | Papineni et al. | 704/2 |
| 6,157,912 A | * | 12/2000 | Kneser et al. | 704/270 |
| 6,490,555 B1 | | 12/2002 | Yegnanarayanan et al. | 704/231 |
| 6,567,778 B1 | * | 5/2003 | Chao Chang et al. | 704/257 |
| 6,856,956 B2 | | 2/2005 | Thrasher et al. | 704/251 |

(Continued)

FOREIGN PATENT DOCUMENTS

EP 0562138 3/1992

(Continued)

OTHER PUBLICATIONS

Discriminative Training for Large-Vocabulary Speech Recognition Using Minimum Classification Error; Erik McDermott, Timothy J. Hazen, Jonathan Le Roux, Atsushi Nakamura and Shigeru Katagiri; IEEE Transactions on Audio, Speech, and Language Processing; 1558-7916; 2006 IEEE.

(Continued)

*Primary Examiner*—Vijay B Chawan
(74) *Attorney, Agent, or Firm*—Joseph R. Kelly; Westman, Champlin & Kelly, P.A.

(57) ABSTRACT

A novel system integrates speech recognition and semantic classification, so that acoustic scores in a speech recognizer that accepts spoken utterances may be taken into account when training both language models and semantic classification models. For example, a joint association score may be defined that is indicative of a correspondence of a semantic class and a word sequence for an acoustic signal. The joint association score may incorporate parameters such as weighting parameters for signal-to-class modeling of the acoustic signal, language model parameters and scores, and acoustic model parameters and scores. The parameters may be revised to raise the joint association score of a target word sequence with a target semantic class relative to the joint association score of a competitor word sequence with the target semantic class. The parameters may be designed so that the semantic classification errors in the training data are minimized.

20 Claims, 4 Drawing Sheets

U.S. PATENT DOCUMENTS

| | | | |
|---|---|---|---|
| 6,920,420 B2* | 7/2005 | Lin | 704/9 |
| 7,016,830 B2* | 3/2006 | Huang et al. | 704/9 |
| 7,191,132 B2* | 3/2007 | Brittan et al. | 704/260 |
| 7,249,012 B2* | 7/2007 | Moore | 704/4 |
| 2002/0042711 A1* | 4/2002 | Lin | 704/257 |
| 2004/0049375 A1* | 3/2004 | Brittan et al. | 704/9 |
| 2004/0098247 A1* | 5/2004 | Moore | 704/4 |
| 2004/0220809 A1 | 11/2004 | Wang et al. | 704/257 |
| 2004/0249628 A1 | 12/2004 | Chelba et al. | 704/4 |
| 2005/0033574 A1* | 2/2005 | Kim et al. | 704/251 |
| 2005/0065789 A1 | 3/2005 | Yacoub et al. | 704/231 |
| 2005/0080611 A1* | 4/2005 | Huang et al. | 704/4 |
| 2005/0080615 A1* | 4/2005 | Huang et al. | 704/9 |
| 2005/0228641 A1 | 10/2005 | Chelba et al. | |
| 2005/0228649 A1* | 10/2005 | Harb et al. | 704/205 |
| 2006/0004570 A1 | 1/2006 | Ju et al. | 704/243 |
| 2006/0069678 A1 | 3/2006 | Chou et al. | 707/5 |
| 2006/0195321 A1 | 8/2006 | Deligne et al. | 704/257 |
| 2007/0100624 A1* | 5/2007 | Weng et al. | 704/257 |
| 2007/0143101 A1* | 6/2007 | Goutte | 704/9 |
| 2008/0113801 A1* | 5/2008 | Moreno | 463/40 |

FOREIGN PATENT DOCUMENTS

| | | |
|---|---|---|
| WO | WO0133551 | 5/2001 |
| WO | 2010029783 A1 | 5/2010 |

OTHER PUBLICATIONS

Discriminative Models for Spoken Language Understanding; Ye-Yi Wang and Alex Acero; Microsoft Research, Redmond, Washington, USA, Sep. 2006.

Minimum Classification Error Rate Methods for Speech Recognition; Biing-Hwang Juang, Wu Chou and Chin-Hui Lee; IEEE Transactions on Speech and Audio Processing, vol. 5, No. 3, May 1997.

Discriminative Learning for Minimum Error Classification; Biing-Hwang Juang and Shigeru Katagiri; IEEE Transactions on Signal Processing, vol. 40, No. 12, Dec. 1992.

PCT/US2008/051584 PCT International Search Report and Written Opinion dated mailed Jun. 23, 2008.

Ye-Yi Wang et al., "Speech Utterance Classification Model Training without Manual Transcriptions" In: 2006 IEEE International Conference on Acoustics, Speech and Signal Processing, ICASSP 2006, May 14, 2006, vol. 1, pp. 553-556.

W. Chou "Discriminant-Function-Based Minimum Recognition Error Rate Pattern-Recognition Approach to Speech Recognition" In: Processing of the IEEE, Aug. 2000, vol. 88, No. 8, pp. 1201-1223.

* cited by examiner

INTEGRATED SPEECH RECOGNITION AND SEMANTIC CLASSIFICATION

BACKGROUND

Speech understanding is a growing field that involves enabling a machine to interpret the meaning of spoken language. One aspect of speech understanding is spoken utterance classification, which seeks to apply semantic classification to spoken utterances. Spoken utterance classification typically involves a two-step process. First, a spoken utterance is processed with techniques of automatic speech recognition, using a language model, to determine the sequence of words expressed in the spoken utterance. Second, the sequence of words is processed with techniques of semantic classification, using a classification model, to parse their meaning.

Each of these two steps has the potential to work imperfectly and produce erroneous results. Since the output from the speech recognition process forms the input to the semantic classification process, this means any erroneous results of the speech recognition process will be perpetuated in the semantic classification process, reflecting the old computing aphorism of "garbage in, garbage out". The risk of erroneous final output from the semantic classification process is therefore compounded. The potential for error has typically been addressed by training the language model to reduce errors in determining the sequences of words from spoken utterances, and training the classification model to reduce errors in determining the semantic classes of the word sequences.

The discussion above is merely provided for general background information and is not intended to be used as an aid in determining the scope of the claimed subject matter.

SUMMARY

A novel system integrates speech recognition and semantic classification, so that the acoustic scores in the speech recognizer that accepts the original spoken utterances may be taken into account when training both language models and semantic classification models, in a variety of embodiments. For example, a joint association score may be defined that is indicative of a correspondence of a semantic class and a word sequence for an acoustic signal. The joint association score may incorporate parameters that are applied to features of the word sequence for signal-to-class modeling of the acoustic signal. It may also incorporate language model parameters and scores, as well as acoustic model parameters and scores. A target word sequence may be identified that has a highest joint association score with a target semantic class. Competitor word sequences may also be identified that each have a highest remaining joint association score with any remaining semantic class. The parameters may then be revised to raise the joint association score of the target word sequence with the target semantic class relative to the joint association score of the competitor word sequence with the target semantic class. The semantic model weighting parameters and language model parameters are designed so that the semantic classification errors in the training data are minimized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
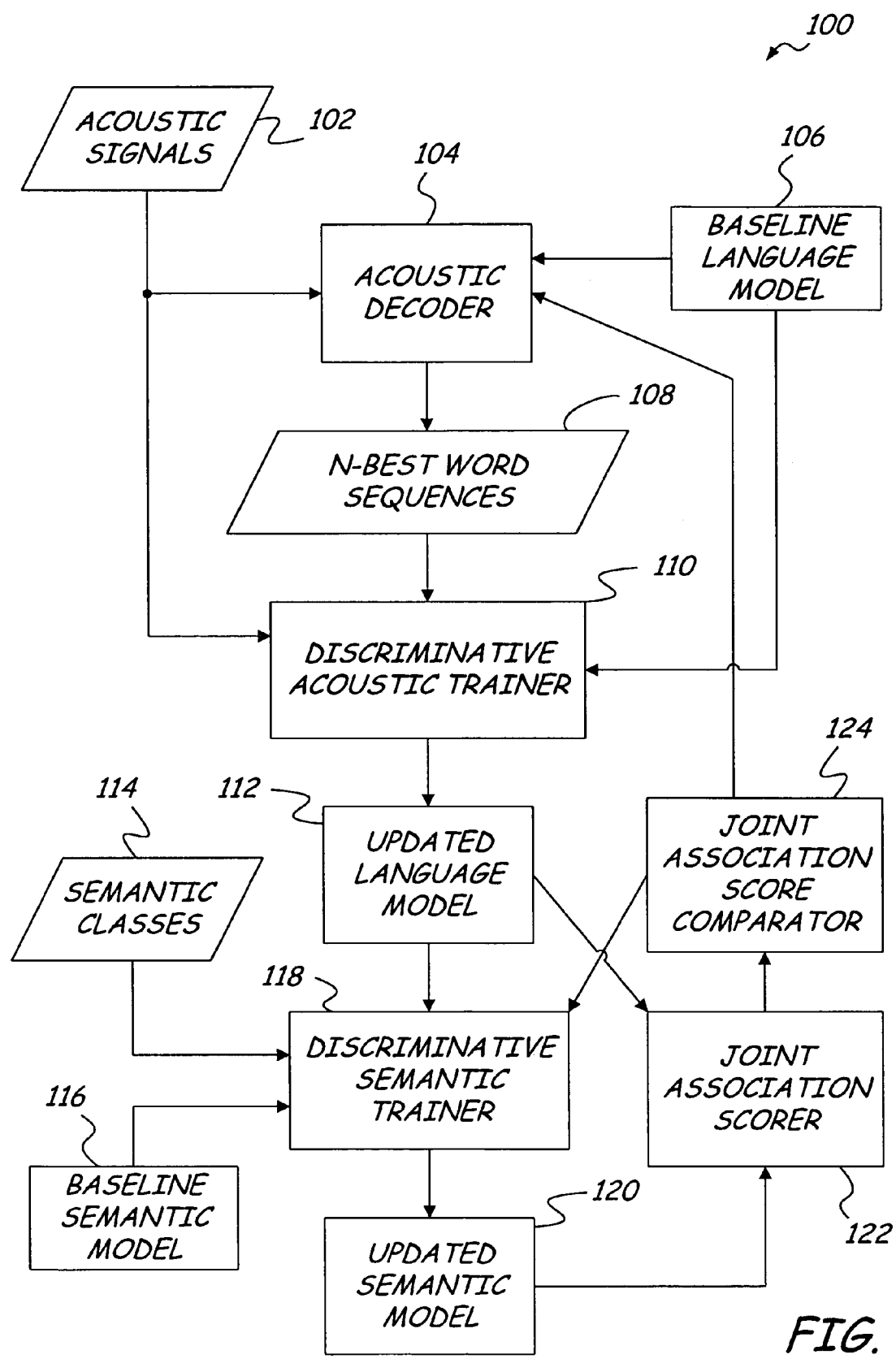
FIG. 1 illustrates a block diagram of a discriminative training system, according to an illustrative embodiment.
Figure 2:
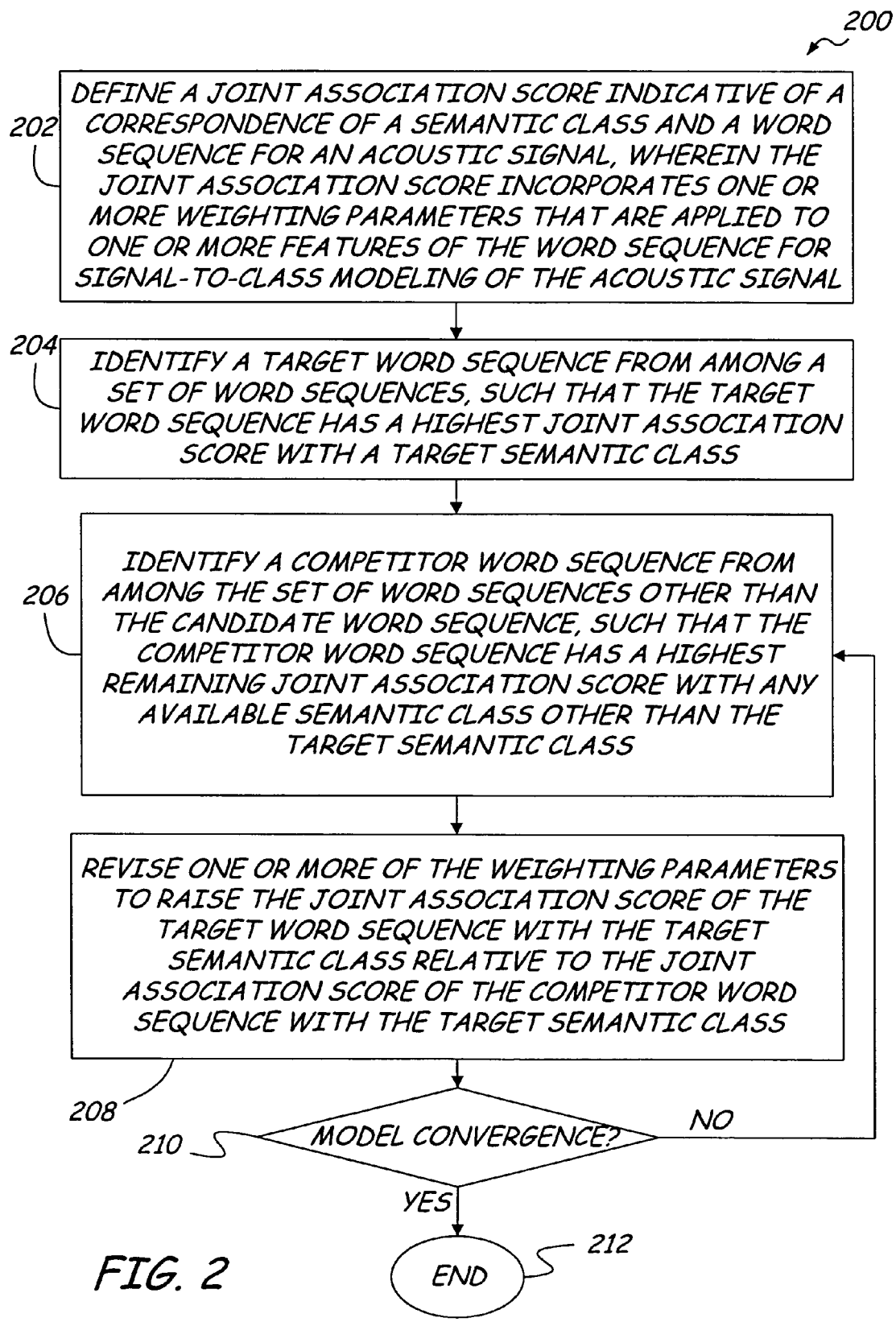
FIG. 2 illustrates a flow diagram of a discriminative training method, according to an illustrative embodiment.

FIG. 1 depicts a block diagram of a discriminative training system 100 that is configured for training a set of speech recognition language models and semantic classification models for integrated speech recognition and semantic classification. Discriminative training system 100 may be implemented in any of a wide variety of software implementations, as will be familiar to those skilled in the art, and which are surveyed below with reference to FIGS. 7 and 8. FIG. 2 provides a flow diagram of an illustrative discriminative training method 200 for the discriminative training associated with discriminative training system 100 of FIG. 1. As a general description of one illustrative embodiment, discriminative training system 100 trains a speech recognition language model and a semantic classification model to assign a sequence of words to a spoken utterance according to the best match between that spoken utterance and its proper semantic classification, even when this is not necessarily the same word sequence that provides the best match for the spoken utterance taken in isolation. The system uses comparisons between correct and erroneous semantic classification of spoken utterances to revise the parameters of the speech recognition language model and the parameters of the semantic classification model, to reduce the potential to give rise to those errors. This integrated approach counteracts the traditional isolation of the two steps in semantic classification of spoken utterances, and neutralizes the potential for initial errors in speech recognition to be perpetuated and compounded in the subsequent step of semantic classification. System 100 is referred to as a discriminative training system because it acts to train weighting parameters of hidden Markov models applied to both language and semantic classification, to discriminate between correct and incorrect word sequences and semantic classes. Further details of various illustrative embodiments are provided below, which are illustrative and indicative of the broader meaning and variety associated with the disclosure and the claims provided herein. These include steps 202, 204, 206, and 208 of method 200, which are described further as follows.

Method 200 begins with step 202, of defining a joint association score indicative of a correspondence of a semantic class and a word sequence for an acoustic signal, wherein the joint association score incorporates one or more weighting parameters that are applied to one or more features of the word sequence for signal-to-class modeling of the acoustic signal. The signal-to-class modeling may include speech recognition modeling, language modeling, semantic classification modeling, or any or all three of them in combination. The signal-to-class modeling may incorporate model parameters and scores for any of speech recognition modeling, language modeling, semantic classification modeling. Referring to discriminative training system 100, one or more acoustic signals 102 may be provided and subjected to an acoustic decoder or preprocessor 104, to provide a set of n-best word sequences 108. For example, in the present illustrative embodiment, acoustic decoder or preprocessor 104 may convert an acoustic signal $X_r$ (102) into an acoustic cepstra sequence. The set of n-best word sequences 108 may be generated, for example, using a lattice of word sequences, which provides a compact representation of n-best word sequences because it can match an acoustic signal with a word sequence by summing up acoustic scores of all paths of the speech lattices that correspond to possible word sequences for the acoustic signal. The n-best word sequences 108 are used to define the initial weighting parameters of the discriminative acoustic trainer 110, which render an updated language model 112 for automatic speech recognition. That is, discriminative acoustic trainer 110 may use minimum classification error discriminative training to update the acoustic model parameters from baseline acoustic model 106. In particular, discriminative acoustic trainer 110 may use weighting parameter update equations that are formed by optimizing a minimum classification error function as discussed in more detail below. Using the update equations, discriminative acoustic trainer 110 produces updated language model 112.

The updated language model 112 and a set of semantic classes 114 are used initially with a baseline semantic model 116 to define the weighting parameters of discriminative semantic trainer 118, which define an updated semantic model 120. Joint association scorer 122 uses an acoustic score and a word string probability for a given word sequence relative to an acoustic signal from updated language model 112, and a class-posterior probability for a given semantic class with respect to a word sequence from updated semantic model 120. Once a set of joint association scores are obtained, they may be compared with each other by joint association score comparator 124. These aspects are further described as follows.

For a given acoustic signal 102, the acoustic scorer or preprocessor 104 interprets the acoustic signal with reference to the baseline language model 106 to generate an n-best list $\omega$ (108) of word sequences $W_r$, i.e. $\omega = \{W_r^0, \ldots, W_r^n\}$. For each of the word sequences $W_r$, a word string probability $P(W_r)$ may be calculated based on the weighting parameters of the language model 106 or 112. For each of the word sequences $W_r$, an acoustic score of the associated acoustic signal $P(X_r|W_r)$ can also be obtained, by summing up the acoustic scores of all the paths on an associated speech lattice that yield the word sequence $W_r$ for the given acoustic signal $X_r$. At discriminative semantic trainer 118, the class-posterior probability $P(C_r|W_r)$ of a semantic class $C_r$ from among the semantic classes 114 matching a word sequence $W_r$ may be modeled with a maximum entropy model, an illustrative example of which is provided as follows, using semantic classification model weighting parameters $\lambda_i$, and lexical features $f_i$ that serve as language model weighting parameters:

$$P(C_r|W_r) = \frac{\exp \sum_i \lambda_i f_i(C_r, W_r)}{\sum_{C_r} \exp(\lambda_i f_i(C_r, W_r))} \quad \text{(Eq. 1)}$$

As an example of the lexical features $f_i$, these may for example include n-gram features, such as bigrams, where n=2:

$$f_{c,w_xw_y}^{bigram}(C_r, W_r) = \begin{cases} 1, & \text{if } C_r = c \wedge w_xw_y \in W_r \\ 0, & \text{otherwise} \end{cases} \quad \text{(Eq. 2)}$$

A goal of discriminative training system 100 is to define a semantic classification decision rule $\hat{C}_r$ that assigns the best semantic class to any acoustic signal, such as a spoken utterance—that is, a rule that uses weighting parameters trained through one or more revisions to render a reduced classification error or a minimum classification error. Put another way, the goal is to devise a semantic classification decision rule $\hat{C}_r$ such that:

$$\hat{C}_r = \underset{C_r}{\operatorname{argmax}} \, P(C_r|X_r) \quad \text{(Eq. 3)}$$

This can be expanded as a function of word string probability $P(W_r)$, acoustic signal $P(X_r|W_r)$, and class-posterior probability $P(C_r|W_r)$, as:

$$\hat{C}_r = \underset{C_r}{\operatorname{argmax}} \left[ \sum_{W_r} P(C_r|W_r, X_r) P(X_r|W_r) P(W_r) \right] \quad \text{(Eq. 4)}$$

Method 200, according to the present illustrative embodiment, incorporates the insight that this equation for the semantic classification decision rule $\hat{C}_r$ can be reliably estimated as:

$$\hat{C}_r \cong \underset{C_r}{\operatorname{argmax}} \left[ \underset{W_r \in \omega}{\max} P(C_r|W_r) P^{\frac{1}{L}}(X_r|W_r) P(W_r) \right] \quad \text{(Eq. 5)}$$

This includes reducing the class-posterior probability to the form $P(C_r|W_r)$ rather than $P(C_r|W_r,X_r)$, and weighting the acoustic signal $P(X_r|W_r)$ with an exponential term of the inverse of L, a function representing the total semantic classification loss, approximating the semantic classification error rate, exhibited by the language model $\Lambda_W$ (112) and the semantic model $\Lambda_W$ (120). Therefore, the maximum of the product of the three probabilities, as taken in Eq. 5, provides the least semantic classification error rate.

Eq. 5, for the semantic classification decision rule $\hat{C}_r$, can be rewritten in an equivalent logarithmic form, as follows:

$$\hat{C}_r \cong \underset{C_r}{\operatorname{argmax}} \left[ \underset{W_r \in \chi}{\max} \left[ \log P(C_r|W_r) P^{\frac{1}{L}}(X_r|W_r) P(W_r) \right] \right] \quad \text{(Eq. 6)}$$

A joint association score $D(C_r,W_r;X_r)$ may be defined as follows:

$$D(C_r, W_r; X_r) = \log \left[ P(C_r|W_r) P^{\frac{1}{L}}(X_r|W_r) P(W_r) \right] \quad \text{(Eq. 7)}$$

It is this joint association score that is defined by joint association scorer 122 in discriminative training system 100, in the illustrative embodiment of FIG. 1. Joint association score $D(C_r,W_r;X_r)$ allows the equation defining the semantic classification decision rule $\hat{C}_r$ to be simplified as follows:

$$\hat{C}_r \cong \underset{C_r}{\arg\max} \left[ \underset{W_r \in \omega}{\max} D(C_r, W_r; X_r) \right] \quad \text{(Eq. 8)}$$

Joint association score $D(C_r, W_r; X_r)$ serves as a class-discriminant function, that rates the joint association of the semantic class $C_r$ from among the semantic classes 114 and the word sequence $W_r$ from among the n-best word sequences 108 for the $r^{th}$ acoustic signal, or spoken utterance, $X_r$. Joint association score $D(C_r, W_r; X_r)$ therefore incorporates one or more weighting parameters that are applied to one or more features of the word sequence $W_r$ from at least one of the baseline language model 106, the updated language model 112, the baseline semantic model 116, or the updated semantic model 120.

Once the joint association scores $D(C_r, W_r; X_r)$ are evaluated by joint association scorer 122, they may be compared with each other by joint association score comparator 124, and a particular word sequence from the n-best set $\omega$ of word sequences (108) may be identified as the target word sequence $W_r^0$ that has the highest joint association, score with a target semantic class $C_r^0$ that is the correct semantic class for the $r^{th}$ acoustic signal, $X_r$, as in step 204 of method 200 in FIG. 2. The target word sequence $W_r^0$ may be identified as the word sequence that satisfies the equation:

$$W_r^0 = \underset{W_r \in \omega}{\arg\max} [D(C_r^0, W_r; X_r)] \quad \text{(Eq. 9)}$$

The target word sequence $W_r^0$ is therefore the most likely sentence to yield the correct semantic classification for the acoustic signal $X_r$, independently of whether or not target word sequence $W_r^0$ would provide the closest matching transcription, as determined by a system for performing automatic speech recognition in isolation from considerations of semantic classification.

With the target word sequence $W_r^0$ thus identified, one or more additional word sequences from among n-best word sequences 108 (other than the target word sequence $W_r^0$) may be matched iteratively with semantic classes from among semantic classes 114 and thus identified as competitor word sequences. This is done by identifying the remaining word sequence that has the highest remaining joint association score with any available semantic class other than the target semantic class $C_r^0$. This may be done iteratively, each time removing the identified competitor word sequences and their matching semantic classes from subsequent consideration, and then finding the remaining word sequence that has the highest joint association with any remaining semantic class. This iterative rule for identifying competitor word sequences can be represented as follows:

$$C_r = \underset{C_r \in C^n}{\arg\max} \left[ \underset{W_r \in \omega^n}{\max} D(C_r^n, W_r; X_r) \right] \quad \text{(Eq. 10)}$$

In Eq. 10, $C_r^n = C \setminus \{C_r^1, \ldots, C_r^{n-1}\}$ and $\omega^n = \omega \setminus \{W_r^1, \ldots, W_r^{n-1}\}$, where $\setminus$ denotes set-difference. The word sequences from among the n-best word sequences $\omega$ (108) are identified as matching corresponding classes from among semantic classes C (114) based on the rule:

$$W_r^n = \underset{W_r \in \omega^n \setminus W_r^1, \ldots, W_r^{n-1}}{\max} D(C_r^n, W_r; X_r)] \quad \text{(Eq. 11)}$$

Therefore, each of the n competitor word sequences $W_r^n$ has the joint association score $D(C_r^n, W_r; X_r)$ with its matching semantic class. Any of a wide variety of number n competitor word sequences may be identified, from 1 up to enough to exhaust the available supply of either word sequences in n-best word sequences $\omega$ (108) or semantic classes from among semantic classes C (114).

Following a minimum classification error framework, in the present illustrative embodiment, a class-specific misclassification function $d_r(X_r)$ and a class-specific loss function $l_r(d_r(X_r))$ may be associated with each acoustic signal $X_r$, as part of identifying errors of semantic classification that may be remedied by revising the weighting parameters. The class-specific loss function $l_r(d_r(X_r))$ is a function of the class-specific misclassification function $d_r(X_r)$ that is configured to approximate a binary decision for each acoustic signal $X_r$ as to whether the acoustic signal has been correctly classified or not. For example, the class-specific loss function $l_r(d_r(X_r))$ may be structured as a sigmoid function that approximates 0 when the acoustic signal $X_r$ is assigned to the correct semantic class, and that approximates 1 when the acoustic signal $X_r$ is assigned to the incorrect semantic class. As an illustrative example, these functions may be defined as follows:

$$d_r(X_r) = -D(C_r^0, W_r^0; X_r) + \log \left[ \frac{1}{N} \sum_{n=1}^{N} \exp[\eta D(C_r^n, W_r^n; X_r)] \right]^{\frac{1}{\eta}} \quad \text{(EQ. 12)}$$

$$l_r(d_r(X_r)) = \frac{1}{1 + \exp(-\alpha d_r(X_r) + \beta)} \quad \text{(EQ. 13)}$$

The parameters $\alpha$ and $\beta$ may be selected empirically to improve performance in distinguishing between correct and erroneous classifications, as will be understood by those skilled in the art. $\alpha$ is a positive constant that controls the size of the learning window and the learning rate, while $\beta$ is a constant measuring the offset of $d_r(X_r)$ from 0. For example, in one experimental set, the loss function was found to be optimized with a value for a of approximately 1.2, and a value for $\beta$ of approximately 20, although these values can be set across a fairly wide range with only a modest amount of loss of performance. It was found in one illustrative embodiment to provide some advantage to set $\beta$ to associate additional loss to samples where the class-specific loss function $l_r(d_r(X_r))$ was otherwise close to 0.5, that is, indicated to be indeterminate between correct and erroneous classification.

The formula for the class-specific misclassification function $d_r(X_r)$ also uses N, which is the number of competitor word sequences, which may be up to one less than the number of word sequences in the n-best word sequences $\omega$ (108). It also uses $\eta$ as a smoothing function. $d_r(X_r)$ is configured to be very small when the semantic classification of acoustic signal $X_r$ is correct, in which case $l_r(d_r(X_r))$ is close to 0; while $d_r(X_r)$ is configured to be very large when the semantic classification of acoustic signal $X_r$ is incorrect, in which case $l_r(d_r(X_r))$ is close to 1. The class-specific loss function $l_r(d_r(X_r))$ may be summed over r to formulate a total classification loss function $L(\Lambda_W, \Lambda_\lambda)$ that approximates the total semantic classification error rate, as follows:

$$L(\Lambda_W, \Lambda_\lambda) = \sum_r l_r(d_r(X_r)) \qquad \text{(EQ. 14)}$$

The total classification loss function $L(\Lambda_W,\Lambda_\lambda)$ thus defined may be targeted for reduction or minimization, as the criterion for revising the weighting parameters $\Lambda_W,\Lambda_\lambda$ to reduce or optimize the semantic classification error rate. This may therefore serve as the basis for revising one or more of the weighting parameters $\Lambda_W,\Lambda_\lambda$ to raise the joint association score $D(C_r,W_r;X_r)$ of the target word sequence $W_r^0$ with the target semantic class $C_r^0$ relative to the joint association score of the competitor word sequences $W_r^n$ with the target semantic class $C_r^0$, as in step 208 of method 200. This may be followed by a step 210 to evaluate whether the language model weighting parameters and/or the semantic classification weighting parameters are approaching convergence, as at decision node 210 of method 200. If they are not yet converging, these steps may be repeated iteratively, while if they are converging, the process may be concluded, as at endpoint 212 of method 200.

As one specific illustrative example of how the revision of weighting parameters as in step 208 works in practice, it may be considered in the context of training a specific set of spoken utterance training data acoustic signals $X_r$ and selected target semantic classes $C_r^0$ in the specific context of an Airline Travel Information System (ATIS), in which a selected set of semantic classes C from among semantic classes 114 are assigned to different word sequences $W_r$ from among n-best word sequences 108 formed by automatic speech recognition of training data acoustic signals 102, and the assignments are iteratively reviewed and their weighting parameters revised for the speech recognition language model and semantic classification model.

As the first step of the training stage, the target word sequences $W_r^0$ are identified from among the best word sequences 108 for having the highest joint association scores with the target semantic classes $C_r^0$, as in step 204 of method 200 of FIG. 2. This also represents going through discriminative training system 100 to joint association score comparator 124 for a first iteration. For example, one particular target semantic class $C_r^0$ may be labeled GRD_SRV(ATL) and may represent the semantic meaning, "What is the ground transportation in Atlanta?" The goal of the ATIS system in this case is to train the speech recognition language model and semantic classification model so that, as closely as possible, any spoken utterance by a customer with the semantic meaning of "What is the ground transportation in Atlanta?" will be matched to the semantic class GRD_SRV(ATL), despite an expected range of variations not only in voice and accent but also in wording. Since the semantic meaning is the type to be expected from an open-ended query, the semantic classification should be able to reliably distinguish this particular semantic meaning from other, potentially unrelated semantic meanings associated with other spoken utterances, some of which may be rather similar in its wording or other acoustic aspects. Accordingly, one of the spoken utterance training data acoustic signals is provided that is rendered into the word sequence "What is the ground transportation in Atlanta?", and system 100 identifies this word sequence as the target word sequence $W_r^0$ as in step 204 of method 200 of FIG. 2. This identification includes joint association scorer 122 defining a joint association score for the target word sequence $W_r^0$ and the target semantic class $C_r^0$, and joint association score comparator 124 identifying the joint association score $D(C_r, W_r;X_r)$ for the particular target word sequence $W_r^0$ as being the highest joint association score of any of the available word sequences for this particular semantic class.

Then, as in step 204 of method 200, system 100 identifies a competitor word sequence $W_r^1$ from among the remaining word sequences $\omega^n = \omega\setminus\{W_r^1, \ldots, W_r^{n-1}\}$, i.e. those word sequences other than the target word sequence $W_r^0$, such that competitor word sequence $W_r^1$ has the highest joint association score $D(C_r,W_r;X_r)$ with any of the remaining semantic classes other than the target semantic class $C_r^0$, that is, from among the remaining semantic classes $C_r^n = C\setminus\{C_r^1, \ldots, C_r^{n-1}\}$, which is identified as $C_r^1$. This may continue through further iterations, identifying a subsequent competitor word sequence $W_r^2$ that has a highest remaining joint association score $D(C_r,W_r;X_r)$ with any of the then remaining semantic classes $C_r^n = C\setminus\{C_r^2, \ldots, C_r^{n-1}\}$, and so forth, and may continue until there are either no word sequences left or no semantic classes left. The spoken utterance acoustic signal $X_r$ may then be assigned to the semantic class $C_r$ that has the highest joint association score $D(C_r,W_r;X_r)$ with any word sequence $W_r$ from among the n-best word sequences $\omega$ (108).

One result of this process is that the target word sequence $W_r^0$ is the one word sequence from the n-best word sequences $\omega$ (108) that is most likely to match with the correct, target semantic class $C_r^0$, while the first competitor word sequence $W_r^1$ is the one word sequence most likely to yield an erroneous semantic class. This mechanism of matching the word sequences with semantic classes is therefore effective at matching the closest competitor against a target word sequence for discriminative training, so that the system can be trained foremost to discern the correct word sequence in comparison with its closest competitor, i.e. the word sequence otherwise most likely to be erroneously identified.

The importance of this system for focusing discriminative training on the closest competitor is demonstrated for the present illustrative example, in Table 1 below, which represents experimentally generated joint association scores:

TABLE 1

| $C_r$ (Class) | $W_r$ (Corresponding word sequence) | D |
|---|---|---|
| GRD_SRV(ATL) | what is the ground transportation in Atlanta | |
| $C_r^0$: GRD_SRV(ATL) | $W_r^0$: what is the transportation in Atlanta | −20.04 |
| $C_r^1$: FARE(ATL) | $W_r^1$: what is the round trip fare from Atlanta | −17.56 |
| $C_r^2$: CITY(ATL) | $W_r^2$: what is the transportation Atlanta | −25.46 |
| $C_r^3$: FLIGHT(ATL) | $W_r^3$: what is the transportation and Atlanta | −28.49 |
| $C_r^4$: FARE_RT(ATL) | $W_r^4$: what is the round trip fare from the Atlanta | −27.98 |
| $C_r^5$: AIR_SRV(ATL) | $W_r^5$: what is the transportation the Atlanta | −29.09 |

In this example, the joint association score of the target word sequence $W_r^0$ with the correct, target semantic class $C_r^0$:GRD_SRV(ATL) is $D(C_r^0,W_r^0;X_r) = -20.04$. On the other hand, the joint association score of competitor word sequence $W_r^1$ with the wrong semantic class, FARE(ATL), is $D(C_r^1,W_r^1;X_r) = -17.56$, higher than $D(C_r^0,W_r^0;X_r)$.

In particular, the competitor word sequence $W_r^1$ happens to include the word "round", which rhymes with "ground", at approximately the same position in the statement as word "ground" in the reference statement for the target class, tending the automatic speech recognition to evaluate these two statements to be closer together than the target word sequence $W_r^0$ is to the reference word sequence, despite $W_r^0$ being the word sequence that actually has a matching semantic meaning. This highlights the shortcoming of traditional systems involving two isolated steps of automatic speech recognition and subsequent semantic classification of a word sequence provided to the semantic classifier without the benefit of any additional information about the source acoustic signal, and the capability of embodiments disclosed herein to resolve this issue.

Hence, the classification decision rule $\hat{C}_r$ acting on $X_r$ initially yields an erroneous semantic class, as indicated by the acoustic signal $X_r$ being matched with a different word sequence ($W_r^1$) than the target word sequence ($W_r^0$) as it was previously identified for having the highest joint association scores with the target semantic classes $C_r^0$. These results also provide guidance for how the parameters that went into that classification need to be revised to raise the joint association score of the target word sequence with the target semantic class, and to decrease the joint association score of the competitor word sequences with the target semantic class.

The weighting parameters for both the language model 112 and the semantic model 120 may be revised subsequent to the minimum classification error training, by applying a steepest descent optimization technique, in one illustrative embodiment. For the language model 112, the weighting parameters may be defined as logarithms of probabilities applied to lexical features, such as n-grams, that reduce or minimize the total loss function $L(\Lambda_W, \Lambda_\lambda)$. In particular, the language model (LM) weighting parameters, in the particular example of lexical bigrams, may be defined as $p_{w_x w_y} = \log(P(w_y|w_x))$, with a revised weighting parameter of revision iteration t+1 expressed relative to the prior form of the weighting parameter in the form of:

$$p_{w_x w_y}^{t+1} = p_{w_x w_y}^t - \varepsilon_{LM} \sum_r \frac{\partial l_r(d_r(X_r))}{\partial p_{w_x w_y}} \quad \text{(EQ. 15)}$$

After applying the chain rule to the derivative expression, this equation becomes:

$$p_{w_x w_y}^{t+1} = p_{w_x w_y}^t - \varepsilon_{LM} \sum_r l_r(d_r)[1 - l_r(d_r)] \left[ \frac{\partial d_r(X_r)}{\partial p_{w_x w_y}} \right] \quad \text{(EQ. 16)}$$

This isolates the partial derivative of the class-specific misclassification function $d_r(X_r)$ of EQ. 12, above, with respect to the language model weighting parameters $P_{w_x w_y}$, which can be resolved as:

$$\frac{\partial d_r(X_r)}{\partial p_{w_x w_y}} = -n(W_r^0, w_x w_y) + \sum_{n=1}^{N} H_r^n n(W_r^n, w_x w_y) \quad \text{(EQ. 17)}$$

Here, $n(W_r^0, w_x w_y)$ denotes the number of times the bigram $w_x w_y$ appears in the word sequence $W_r^0$ and $n(W_r^n, w_x w_y)$ denotes the number of times the bigram $w_x w_y$ appears in the word sequence $W_r^n$. EQ. 17 also includes weighting parameters $H_r^n$, that directly incorporate the information from the joint association scores $D(C_r, W_r; X_r)$, as follows:

$$H_r^n = \frac{\exp[\eta D(C_r^n, W_r^n; X_r)]}{\sum_{m=1}^{N} \exp[\eta D(C_r^m, W_r^m; X_r)]} \quad \text{(EQ. 18)}$$

As $\eta$ is increased, and even approaches infinity, the weighting parameters that are associated with the target word sequence $W_r^0$ but not competitor word sequence $W_r^1$ are increased while those associated with competitor word sequence $W_r^1$ but not target word sequence $W_r^0$ are decreased. Revisions produced for bigrams common to both the target word sequence $W_r^0$ and the competitor word sequence $W_r^1$ therefore cancel out, and those corresponding language model weighting parameters are left unchanged. Meanwhile, the language model parameters corresponding to the bigrams that are present in the target word sequence $W_r^0$ but not in the competitor word sequence $W_r^1$ are increased. In the example of Table 1 above, these bigrams would include "the transportation", "transportation in", and "in atlanta". On the other hand, the language model parameters corresponding to the bigrams that are present in the competitor word sequence $W_r^1$ but not in the target word sequence $W_r^0$ are decreased. In the example of Table 1 above, these bigrams would include "the round", "round trip", "trip fare", "fare from", and "from Atlanta". While the particular example of bigrams are used here, analogous effects could be achieved with any other type of language model weighting coefficient, including n-grams of other n or other lexical features, and either one or any number of different type of language model weighting parameters. One or more weighting parameters may therefore be revised to raise the joint association score of the target word sequence with the target semantic class relative to the joint association score of the competitor word sequence with the target semantic class, according to the present illustrative embodiment.

Analogous functions may be applied to the semantic classification weighting parameters, which may for example correspond to lexical features of the word sequence, in this illustrative embodiment. A revised semantic classifier parameter $\lambda^{t+1}$ may be provided with reference to an initial or prior-iteration semantic classifier parameter $\lambda^t$ according to the equation:

$$\lambda_k^{t+1} = \lambda_k^t - \varepsilon_\lambda \sum_r \frac{\partial l_r(d_r(X_r))}{\partial \lambda_k} \quad \text{(EQ. 19)}$$

Applying the chain rule to this equation as well, produces:

$$\lambda_k^{t+1} = \lambda_k^t - \varepsilon_\lambda \alpha \sum_r l_r(d_r(X_r))[1 - l_r(d_r(X_r))] \frac{\partial d_r(X_r)}{\partial \lambda_k} \quad \text{(EQ. 20)}$$

Extending the analogy to the revision of the language model weighting parameters, this isolates the partial derivative of the class-specific misclassification function $d_r(X_r)$ of EQ. 20, above, with respect to the semantic classification weighting parameters $\lambda_k$, which can be resolved as:

$$\frac{\partial d_r(X_r)}{\partial \lambda_k} = \varphi(C_r^0, W_r^0) + \sum_{j=1}^{N} H_r^n \varphi(C_r^0, W_r^0) \quad \text{(EQ. 21)}$$

Here, φ incorporates semantic model weighting parameters based on the semantic classes $C_r^j$ and word sequences $W_r^j$, as follows:

$$\varphi(C_r^0, W_r^0) = \frac{\partial \log P(C_r^j \mid W_r^j)}{\partial \lambda_k} \quad \text{(EQ. 22)}$$

$$\varphi(C_r^0, W_r^0) = \quad \text{(EQ. 23)}$$

$$f_k(C_r^j \mid W_r^j) - \sum_{\tilde{C}} \frac{\left(\exp\left[\sum_i \lambda_i f_i(\tilde{C}, W_r^j)\right]\right)}{\sum_{\tilde{C}} \left(\exp\left[\sum_i \lambda_i f_i(\tilde{C}, W_r^j)\right]\right)} f_k(\tilde{C} \mid W_r^j)$$

Again in analogy to the language model weighting parameters, this enables the semantic classification weighting parameters associated with the target semantic class $C_r^0$ but not with the competitor semantic class $C_r^1$ are increased, while those associated with competitor semantic class $C_r^1$ but not target semantic class $C_r^0$ are decreased. Once again, therefore, one or more weighting parameters may be revised to raise the joint association score of the target word sequence with the target semantic class relative to the joint association score of the competitor word sequence with the target semantic class, according to the present illustrative embodiment.

A semantic understanding system may therefore be provided for an application that includes speech recognition and semantic classification systems that have been trained by systems analogous to those described above. Such an application, such as a voice user interface, for example, may be configured to receive a speech input, match the speech input to a semantic class and to a word sequence corresponding to the semantic class, and provide the semantic classes matched to the speech input to an application configured to provide user output that is dependent on the semantic classes matched to the speech input, in an illustrative embodiment. The speech input may be matched to a semantic class and to a corresponding word sequence by applying a semantic classification tool to the speech input, wherein the semantic classification rule selects for the highest joint association score between a semantic class and a word sequence for the speech input. The joint association score may include parameters of a language model and parameters of a semantic classification model that have been iteratively trained to reduce a total loss function indicative of a rate of error in semantically classifying speech inputs due to errors in either the language model or the semantic classification model, in this illustrative embodiment.

The example of an Airline Travel Information System (ATIS) was referred to with reference to the training process, and is one example of an application in which an embodiment of a trained speech recognizer and semantic classifier may illustratively be embodied. That is only one of many possible examples, and any system for voice input and voice user interface, among other potential examples, may also incorporate various embodiments that may be discerned by those skilled in the art based on the disclosure herein.

Figure 3:
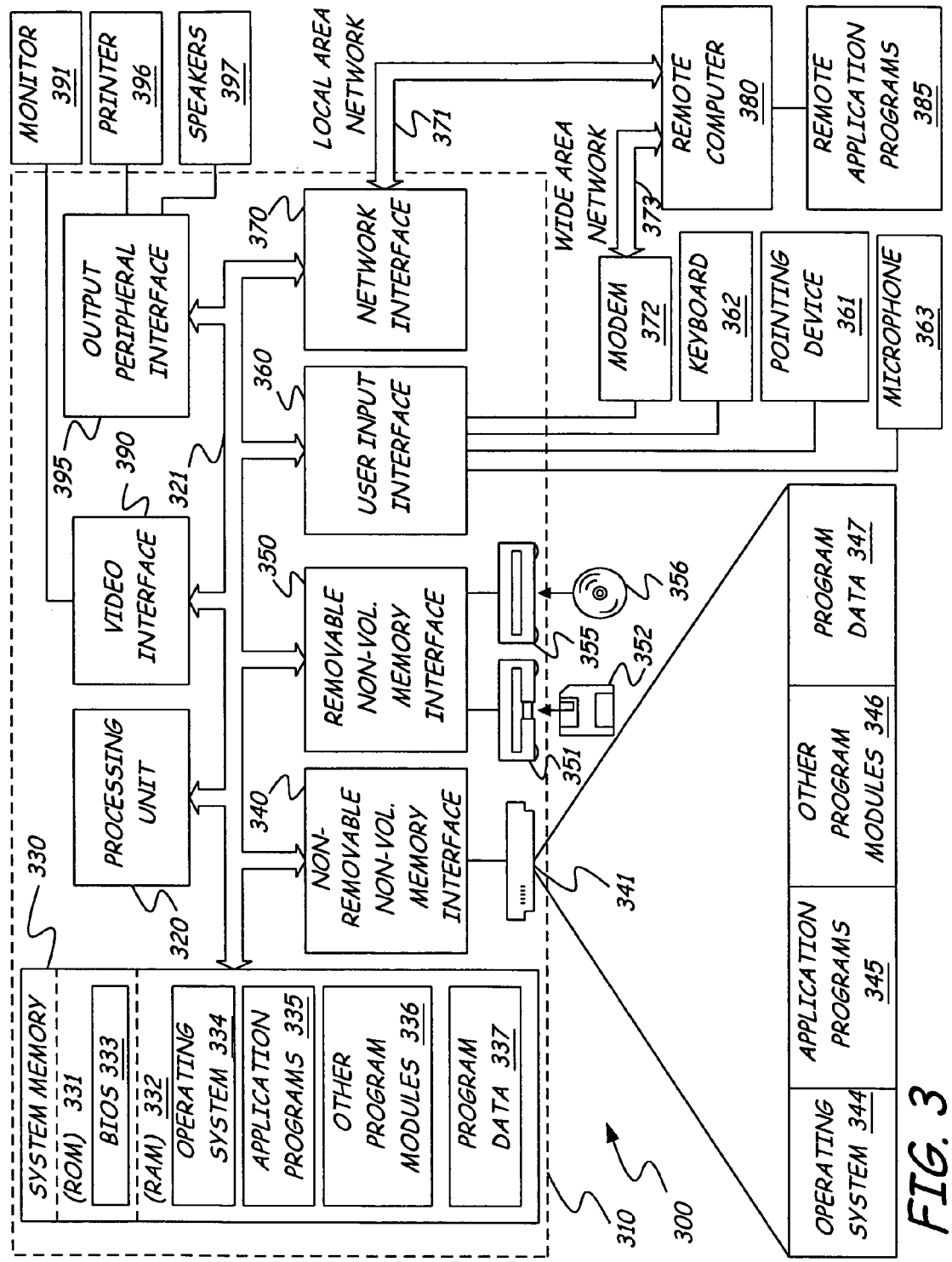
FIG. 3 is a block diagram of one computing environment in which some embodiments may be practiced, according to another illustrative embodiments.

FIG. 3 illustrates an example of a suitable computing system environment 300 on which various embodiments may be implemented. For example, various embodiments may be implemented as software applications, modules, or other forms of instructions that are executable by computing system environment 300 and that configure computing system environment 300 to perform various tasks or methods involved in different embodiments. A software application or module associated with an illustrative implementation of integrated speech recognition and semantic classification training system may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

Computing system environment 300 as depicted in FIG. 3 is only one example of a suitable computing environment for implementing various embodiments, and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 3, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 3 illustrates operating system 334, application programs 335, other program modules 336, and program data 337.

The computer 310 may also include other removable/non-removable volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on remote computer 380. It will be appreciated that the network connections shown are exemplary and other means of establishing a communications link between the computers may be used.

Figure 4:
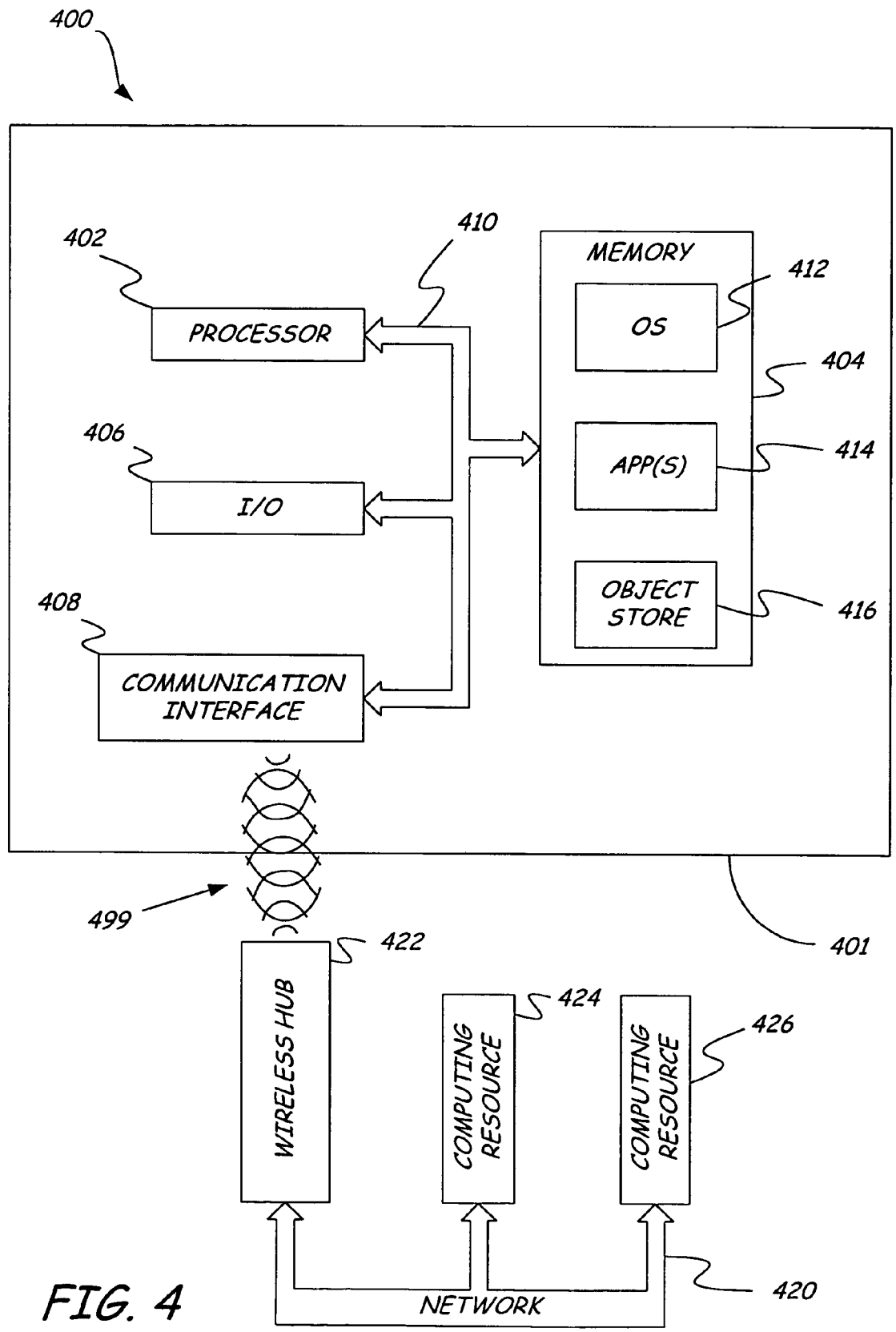
FIG. 4 is a block diagram of a computing environment in which some embodiments may be practiced, according to another illustrative embodiment.

FIG. 4 depicts a block diagram of a general mobile computing environment, comprising a mobile computing device and a medium, readable by the mobile computing device and comprising executable instructions that are executable by the mobile computing device, according to another illustrative embodiment. FIG. 4 depicts a block diagram of a mobile computing system 400 including mobile device 401, according to an illustrative embodiment. Mobile device 401 includes a microprocessor 402, memory 404, input/output (I/O) components 406, and a communication interface 408 for communicating with remote computers or other mobile devices. In one embodiment, the afore-mentioned components are coupled for communication with one another over a suitable bus 410.

Memory 404 is implemented as non-volatile electronic memory such as random access memory (RAM) with a battery back-up module (not shown) such that information stored in memory 404 is not lost when the general power to mobile device 400 is shut down. A portion of memory 404 is illustratively allocated as addressable memory for program execution, while another portion of memory 404 is illustratively used for storage, such as to simulate storage on a disk drive.

Memory 404 includes an operating system 412, application programs 414 as well as an object store 416. During operation, operating system 412 is illustratively executed by processor 402 from memory 404. Operating system 412, in one illustrative embodiment, is a WINDOWS® CE brand operating system commercially available from Microsoft Corporation. Operating system 412 is illustratively designed for mobile devices, and implements database features that can be utilized by applications 414 through a set of exposed application programming interfaces and methods. The objects in object store 416 are maintained by applications 414 and operating system 412, at least partially in response to calls to the exposed application programming interfaces and methods.

Communication interface 408 represents numerous devices and technologies that allow mobile device 400 to send and receive information. The devices include wired and wireless modems, satellite receivers and broadcast tuners to name a few. Mobile device 400 can also be directly connected to a computer to exchange data therewith. In such cases, communication interface 408 can be an infrared transceiver or a serial or parallel communication connection, all of which are capable of transmitting streaming information.

Input/output components 406 include a variety of input devices such as a touch-sensitive screen, buttons, rollers, and a microphone as well as a variety of output devices including an audio generator, a vibrating device, and a display. The devices listed above are by way of example and need not all be present on mobile device 400. In addition, other input/output devices may be attached to or found with mobile device 400.

Mobile computing system 400 also includes network 420. Mobile computing device 401 is illustratively in wireless communication with network 420—which may be the Internet, a wide area network, or a local area network, for example—by sending and receiving electromagnetic signals 499 of a suitable protocol between communication interface 408 and wireless interface 422. Wireless interface 422 may be a wireless hub or cellular antenna, for example, or any other signal interface. Wireless interface 422 in turn provides access via network 420 to a wide array of additional computing resources, illustratively represented by computing resources 424 and 426. Naturally, any number of computing devices in any locations may be in communicative connection with network 420. Computing device 401 is enabled to make use of executable instructions stored on the media of memory component 404, such as executable instructions that enable computing device 401 to implement various functions of discriminative training for integrated speech recognition and semantic classification, in an illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A computer-implemented method performed by a computer with a processor, of training model parameters, the method comprising:

identifying a target word sequence from among a set of word sequences, such that the target word sequence has a highest joint association score with a target semantic class, wherein the joint association score is indicative of a correspondence of a semantic class and a word sequence for an acoustic signal, wherein the joint association score incorporates one or more parameters that are applied to one or more features of the word sequence for signal-to-class modeling of the acoustic signal, the one or more parameters including parameters applied to one or more features to match the acoustic signal to the word sequence and parameters applied to one or more features of the word sequence to match the word sequence to a semantic class;

identifying, with the processor, a competitor word sequence from among the set of word sequences other than the target word sequence, such that the competitor word sequence has a highest remaining joint association score with any available semantic class other than the target semantic class; and revising, with the processor, one or more of the parameters to raise the joint association score of the target word sequence with the target semantic class relative to the joint association score of the competitor word sequence with the target semantic class.

2. The method of claim 1, wherein revising the parameters comprises increasing one or more of the parameters that apply to signal-to-class modeling features of the target word sequence and not to signal-to-class modeling features of the competitor word sequence.

3. The method of claim 1, wherein revising the parameters comprises decreasing one or more of the parameters that apply to signal-to-class modeling features of the competitor word sequence and not to signal-to-class modeling features of the target word sequence.

4. The method of claim 1, wherein the signal-to-class modeling comprises an automatic speech recognition language model matching an acoustic signal with a word sequence, and the parameters are applied to lexical features of the word sequence.

5. The method of claim 4, wherein the lexical features comprise n-grams in the word sequence.

6. The method of claim 4, wherein the automatic speech recognition language model matches an acoustic signal with a word sequence using speech lattices.

7. The method of claim 6, wherein the automatic speech recognition language model matches an acoustic signal with a word sequence by summing up acoustic scores of all paths of the speech lattices that correspond to possible word sequences for the acoustic signal.

8. The method of claim 1, wherein the signal-to-class modeling comprises a semantic classification model matching a word sequence with a semantic class, and the parameters are applied to semantic features of a semantic class.

9. The method of claim 8, wherein the semantic features correspond to lexical features of the word sequence.

10. The method of claim 1, further comprising:
iteratively identifying additional competitor word sequences from among the remaining word sequences other than the target word sequence and previously identified competitor word sequences, such that each of the competitor word sequences has a highest remaining joint association score with any remaining semantic class that has not previously been used for a highest joint association score; and
increasing one or more of the parameters that apply to signal-to-class modeling features of the target word sequence and not to signal-to-class modeling features of any of the competitor word sequences.

11. The method of claim 1, further comprising:
identifying one or more additional target word sequences from among the set of word sequences, the additional target word sequences having highest joint association scores with one or more additional target semantic classes, for one or more additional acoustic signals; and
for each of the target semantic classes, revising weighting factors to increase the joint association scores of the target word sequences with the target semantic classes.

12. The method of claim 11, further comprising:
assigning a total loss function that parameterizes the joint association scores of the target word sequences and the competitor word sequences with the target semantic classes;
using the total loss function as a weighting parameter applied to a component of the joint classification score that indicates a probability of a word sequence corresponding to an acoustic signal; and
iteratively adjusting the weighting parameters applied to one or more features of the word sequence for signal-to-class modeling of the acoustic signal to reduce the total loss function.

13. The method of claim 1, further comprising providing a system that automatically semantically classifies spoken language using an automatic speech recognition language model that incorporates one or more of the revised parameters.

14. The method of claim 1, further comprising providing a system automatically semantically classifies spoken language using a semantic classification model that incorporates one or more of the revised parameters.

15. The method of claim 1, wherein the joint association scores of the word sequences with the target semantic class are modeled using a maximum entropy model.

16. The method of claim 1, wherein updating one of the parameter values comprises using an update equation that is formed by using minimum classification error training.

17. The method of claim 1, wherein updating one of the parameter values comprises using an update equation that is formed by using a steepest descent optimization technique.

18. The method of claim 1, wherein the acoustic signal comprises a spoken utterance.

19. A medium comprising instructions that are readable and executable by a computing system, with a processor, wherein the instructions cause the computing system to train an integrated automatic speech recognition and semantic classification system that recognizes and semantically classifies acoustic signals, comprising causing the computing system to:
use a speech lattice to determine, with the processor, language model parameters for matching a set of acoustic signals to a set of word sequences;
use a maximum entropy model to determine, with the processor, semantic classification model parameters for matching the set of word sequences to a set of semantic classes;
evaluate a classification decision rule, with the processor, that matches acoustic signals to corresponding semantic classes, incorporating the language model parameters and the semantic classification model parameters;
determine, with the processor, a total classification loss function indicative of a rate of error in matching the acoustic signals to word sequences to semantic classes;
weight the language model parameters in the classification decision rule to account for the total classification loss function;
iteratively update, with the processor, at least one of the language model parameters and the semantic classification model parameters to reduce the total classification loss function that incorporates errors in semantically classifying acoustic signals due to the language model and the semantic classification model; and
provide the classification decision rule incorporating the at least one of the iteratively updated language model parameters and the semantic classification model parameters, for the integrated automatic speech recognition and semantic classification system.

20. A medium comprising instructions that are readable and executable by a computing system with a processor, wherein the instructions cause the computing system to perform an integrated process of automatic speech recognition and automatic speech semantic classification on speech inputs, comprising causing the computing system to:
receive a speech input;
match, with the processor, the speech input to a semantic class and to a word sequence corresponding to the semantic class by applying a semantic classification rule to the speech input, wherein the semantic classification rule matches the speech input to the semantic class and the word sequence that has the highest joint association score between the semantic class and the word sequence for the speech input; and
provide, with the processor, the semantic classes matched to the speech input to an application that provides user output that is dependent on the semantic classes matched to the speech input;
wherein the joint association score comprises parameters of a language model and parameters of a semantic classification model that have been iteratively trained to reduce a total loss function indicative of a rate of error in semantically classifying speech inputs due to errors in both the language model and the semantic classification model.

* * * * *